United States Patent [19]

Tamura

[11] Patent Number: 4,928,518

[45] Date of Patent: May 29, 1990

[54] OXYGEN SENSOR OPERABILITY SENSING ARRANGEMENT

[75] Inventor: Hideyuki Tamura, Yokohama, Japan

[73] Assignee: Nissan Motor Company, Limited, Yokohama, Japan

[21] Appl. No.: 311,796

[22] Filed: Feb. 17, 1989

[30] Foreign Application Priority Data

Feb. 25, 1988 [JP] Japan ................................ 63-43488

[51] Int. Cl.[5] .......................................... G01M 15/00

[52] U.S. Cl. ...................................... 73/117.3; 73/23

[58] Field of Search ...................... 73/118.1, 117.3, 23

[56] References Cited

U.S. PATENT DOCUMENTS 4,402,217 9/1983 Higashiyama ...................... 73/117.3
4,497,057 1/1985 Kato et al. ...................... 73/117.3 X
4,527,424 7/1985 Takahashi ...................... 73/117.3 X
4,780,826 10/1988 Nakano et al. ................ 73/117.3 X
4,794,790 1/1989 Metaxa et al. ................. 73/118.1 X

FOREIGN PATENT DOCUMENTS 57-72054 5/1982 Japan .
63-71538 3/1988 Japan .

*Primary Examiner*—Jerry W. Myracle
*Attorney, Agent, or Firm*—Foley & Lardner, Schwartz, Jeffery, Schwaab, Mack, Blumenthal & Evans

[57] ABSTRACT

The output of an oxygen sensor and the engine operation are monitored and, in the event that the voltage generated by the sensor remains within a predetermined window for a predetermined time while the engine temperature is above a predetermined level and the engine is operating within a given set of conditions which define a suitable testing zone, the sensor is indicated as malfunctioning.

6 Claims, 5 Drawing Sheets

OXYGEN SENSOR OPERABILITY SENSING ARRANGEMENT

BACKGROUND OF THE INVENTION

1. Field of the Invention

The present invention relates generally to air-fuel control arrangements and more specifically to a diagnostic arrangement which monitors the functioning of an exhaust gas oxygen sensor and enables a malfunction of the same to be detected.

2. Description of the Prior Art

In order to accurately maintain the desired air-fuel ratio it is common to sense the content of the exhaust gases (i.e. the oxygen concentration) and to perform feedback control of the fuel supply in order to obtain said desired air-fuel ratio.

Commonly used systems usually include a zirconia type sensor and use the level of the output of the sensor for air-fuel ratio feedback control. However, in the event that the sensor malfunctions the appropriate supply of fuel required to maintain the desired combustion characteristics becomes impossible and leads to the situation wherein the engine emissions increase and/or misfiring tends to occur. However, even under these conditions it is difficult for the average driver to diganose the problem accurately.

In order to overcome this problem arrangements of the nature disclosed in JP-A-57-72054 have been proposed wherein a memory is provided in the control circuit and arranged to contain pre-recorded data which enables the ready detection of a malfunction. This arrangement detects if the sensor output fluctuates back and forth between a level which is indicative of a rich mixture and that indicative of a lean one in order to determine the presence or absence of a malfunction. However, as the sensor is incapable of generating a suitable signal until properly warmedup operability thereof is delayed until such time as the engine has just completed its warming up.

However, if the lead line connecting the sensor to the control system breaks, it in fact becomes impossible to actually determine if the sensor is malfunctioning or not.

SUMMARY OF THE INVENTION

It is an object of the present invention to provide an oxygen sensor diagnostic device of the above described type which can accurately discriminate between normal operation and a malfunction.

In brief, the above object is achieved by an arrangement wherein the output of an oxygen sensor and the engine operation are monitored and, in the event that the voltage generated by the sensor remains within a predetermined window for a predetermined time while the engine temperature is above a predetermined level and the engine is operating within a given set of conditions which define a suitable testing zone, the sensor indicates malfunctioning.

More specifically, a first aspect of the present invention is deemed to comprise: a method of monitoring the operation of a oxygen sensor and diagnosing a malfunction thereof, the method featuring the steps of: sensing the oxygen content of exhaust gases emitted from an internal combustion engine using an oxygen sensor, said oxygen sensor being operatively disposed in an exhaust conduit and arranged to be exposed to the exhaust gases emitted from said engine; sensing said engine having assumed a warmed-up status; sensing the engine load and the engine speed and determining the instant engine operational status using said engine load and engine speed after the engine has warmed-up; determining if the instant engine operational status falls within a predetermined operational zone; and indicating a oxygen sensor malfunction in the event that the oxygen sensor output remains continuously below a first predetermined value and above a second predetermined value for a predetermined period of time with said engine operating in said predetermined operational zone.

A second aspect of the instant invention is deemed to comprise: an oxygen malfunction detection arrangement which features: an oxygen sensor, said oxygen sensor being operatively disposed in an exhaust conduit and arranged to be exposed to the exhaust gases emitted from an engine; an engine temperature sensor, said engine temperature sensor being arranged to issue a signal indicative of the engine coolant temperature; an engine crank angle sensor; means for producing a signal indicative of engine load; a control circuit, said control circuit including means for: sensing the engine load and the engine speed, based on the the outputs of said engine crankangle sensor and said engine load indicating signal means and for determining the instant vehicle driving status; determining if the instant engine operational status falls within a predetermined operational zone; and indicating a oxygen sensor malfunction in the event that the oxygen sensor output remains continuously below a first predetermined value and above a second predetermined value for a predetermined period of time after the engine temperature sensor indicates that the engine has warmed-up and the engine is detected as operating in said predetermined operational zone.

DETAILED DESCRIPTION OF THE PREFERRED EMBODIMENTS

Figure 1:
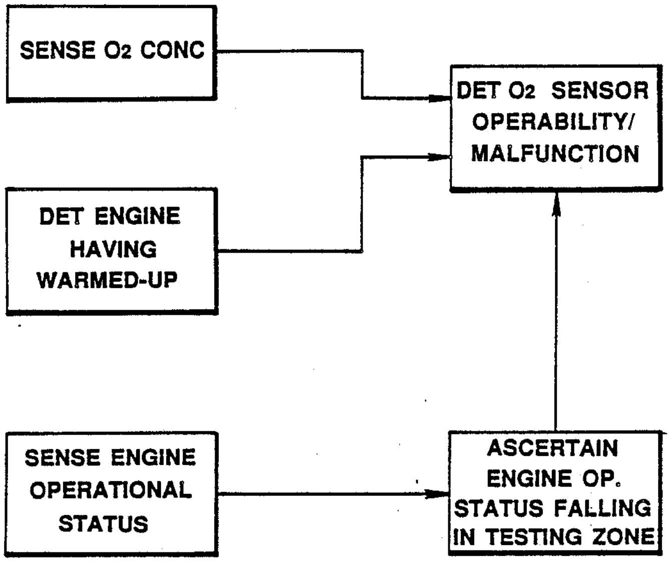
FIG. 1 is a block diagram showing the concept of the instant invention.
Figure 2:
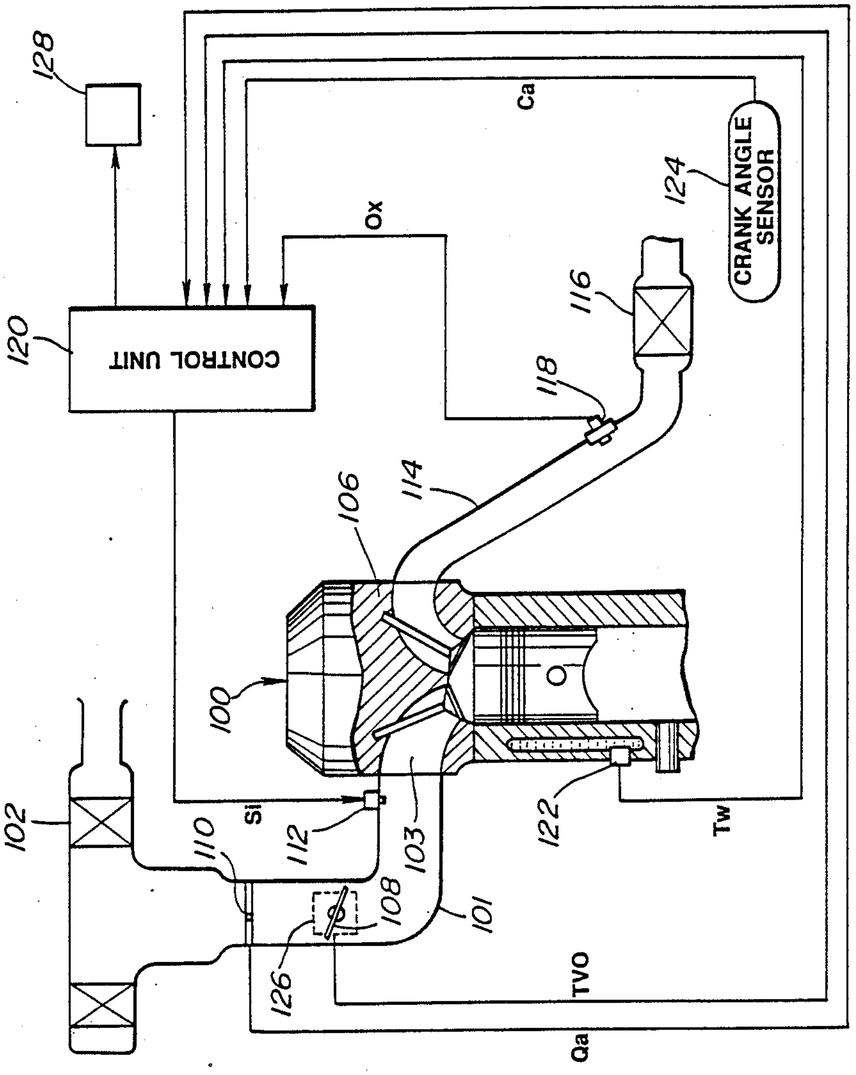
FIG. 2 shows an engine system of the nature to which the embodiments of the present invention are applied.

FIG. 2 shows an engine system of the type to which the present invention is applicable. In this system the combustion chamber of chambers of the engine 100 are supplied with air via in induction arrangement including an induction conduit 101 which leads from an air cleaner 102 to an induction port 103 formed in the cylinder head 106 of the engine. The induction conduit 101 includes a throttle chamber in which a throttle valve 108 is disposed and an air flow meter or sensor 110. In this instance the air flow meter takes the form of a hot wire type flow sensor.

A fuel injector 112 is disposed in the induction conduit 101 and arranged to inject fuel into the air at a location immediately upstream of the intake port 103.

An exhaust system includes an exhaust conduit 114, a catalytic converter 116 which is disposed in the conduit 114, an oxygen sensor 118 which disposed in the exhaust conduit 114 at a location upstream of the converter unit 116.

In this embodiment the catalytic converter 116 is selected to be the type which is able to simultaneously reduce the concentrations of CO, HC and NOx.

A control unit 120 is arranged to receive data inputs Qa, Ox, Tw, Ca and TVO from the air flow sensor 110, the oxygen sensor 118, a coolant temperature sensor 122, a crank angle sensor 124 and a throttle position sensor 126, respectively.

The control unit 120 is further operatively connected with the fuel injector(s) 112 in a manner to control the amount of fuel injected thereby, and a warning device 128 such as a lamp or the like which can be illuminated in order to indicate a oxygen sensor malfunction.

In this embodiment the oxygen sensor 118 comprises a basic body of zirconia which is provided with platinum electrode coatings on both the outer surface which is exposed to the exhaust gases and the interior thereof which is arranged to communicate with the atmosphere and thus be exposed to an ambient oxygen concentration. A cover is provided about the sensing arrangement in order to protect the same from the tiny abrasive particles which are inevitably entrained in the exhaust gases.

As the concentration of the oxygen in the air in contact with the inner electrode is much higher than that in the exhaust gases to which the outer electrode is exposed a movement of oxygen ions through the zirconia body is induced in a manner which results in a voltage signal being impressed on the inner electrode. Depending on the magnitude of the oxygen concentration difference and the internal resistance of the sensor (R) the level of the voltage signal varies.

Figure 3:
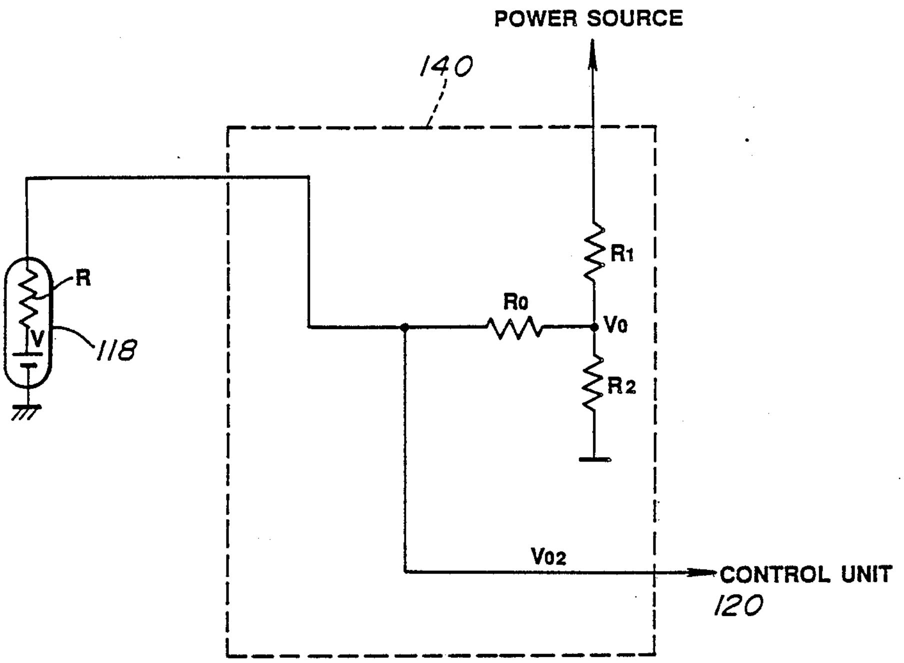
FIG. 3 shows a circuit arrangement utilized in connection with the instant embodiment.

FIG. 3 shows a circuit arrangement including the oxygen sensor 118 and a signal detection circuit 140. This latter mentioned circuit 140 includes resistances R0, R1, and R2. As shown, R1 is arranged to be connected to a source of electrical power which is arranged to exhibit a constant predetermined voltage level. The resistances R0, R1 and R2 are appropriately selected in view of the the fact that V is normally about 300 mV and R varies between 500 k to 1 M Ohm. The illustrated circuit modifies the voltage signal generated by the sensor and outputs a voltage signal VO2 to the control circuit.

The control unit 120 includes a microprocessor which determines the operational zone in which the engine is operating based on the inputs from the air flow sensor 110, throttle position sensor 126, and the crank angle sensor 124. The unit 120 further determines, based on the outputs of the coolant temperature sensor 122 and the oxygen sensor 118, if the output of the oxygen sensor 118 indicates whether the sensor is malfunctioning or not.

In order to achieve the above diagnostic operation, the control unit 120 is further provided with a memory arrangement in which a suitable program is stored. Of course programs required for air-fuel ratio feedback control along with other essential controls are also contained in this memory. The control unit 120 further includes suitable hardware for issuing control signals to the fuel injector(s) 112 and the warning lamp 128.

Figure 4:
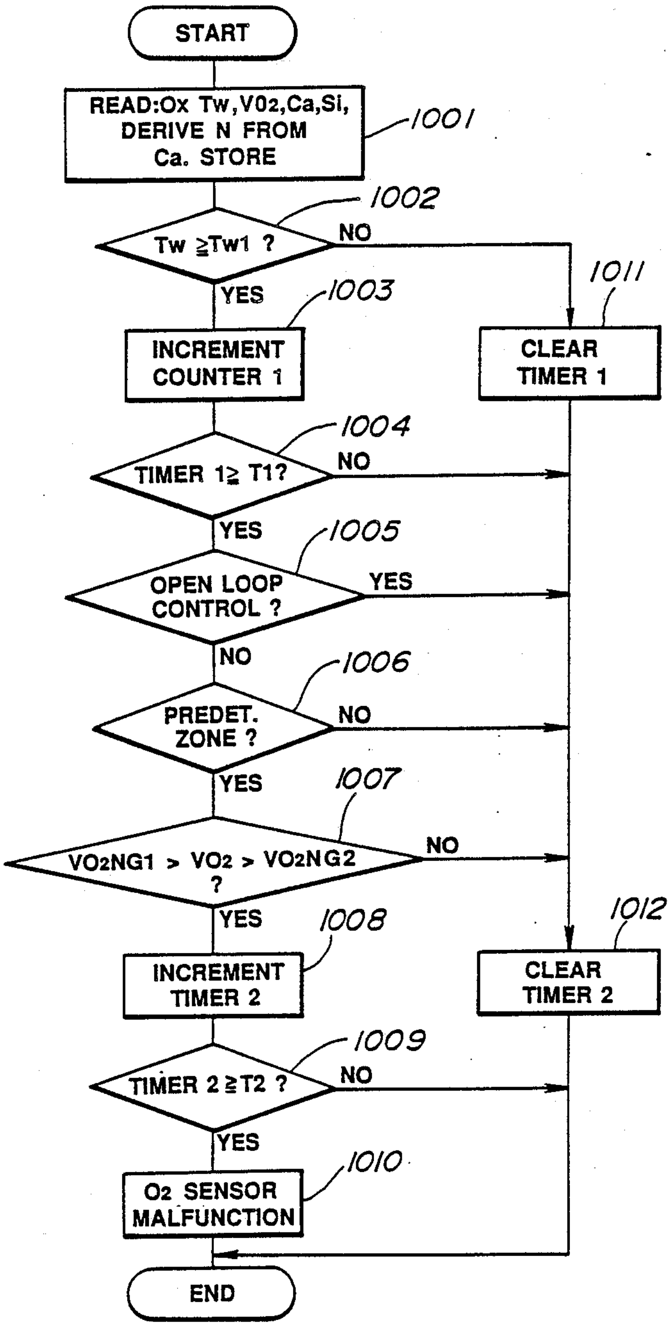
FIG. 4 is a flow chart showing the operational steps which characterize the instant invention.

FIG. 4 shows in flow chart to form the basic operations which are performed by the microprocessor in order to diagnose any malfunction which might have occured in the sensor.

Step 1001 of this routine is such as to read the output of the various sensors and circuits and to derive and/or read values Ox, Tw, VO2, Va and Si, and subsequently derive values Tp and N wherein wherein: Tp denotes the pulse width of a signal which varies with the load on the engine (e.g. based on the pulse width of injector control signal Si), and N denotes the engine speed as determined by the pulse type signal Ca generated by the crank angle sensor. It should be noted at this point that is is alternatively possible to read the throttle position sensor output TVO and utilize this value either alone or in conjuction with the value of another engine operational parameter such as the output Qa of the air flow sensor and utilize these parameters to determine the engine load in place of the injection control signal pulse width, if so desired.

The values which are read and/or derived, are latched or otherwise set in memory and the program flows to step 1002 wherein the instant coolant temperature Tw is compared with a predetermined value TW1 indicative the engine having reached a fully warmed-up status. Until temperature Tw1 is reached, the program returns via counter clearing steps 1011 and 1012.

However, upon the engine 100 being detected as being appropriately warmed up, the routine goes to step 1003 wherein a first counter is induced to count up by one and at step 1003 the instant value of counter 1 checked against a predetermined value T1. Until the count is reached the program returns vis step 1012.

Figure 5:
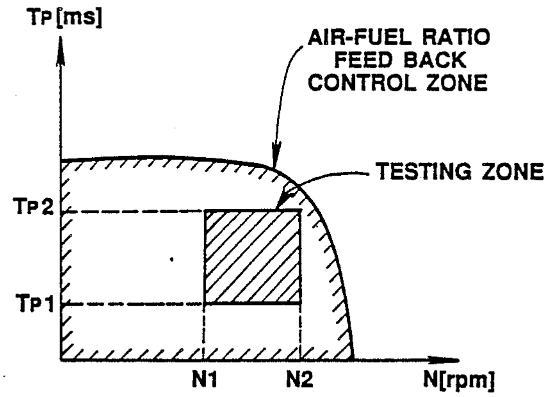
FIG. 5 is a chart showing in terms of engine speed and a pulse width indicative of the load on the engine, an example of the testing zone in which the diagnostic operation according to the present invention is carried out.
Figure 6:
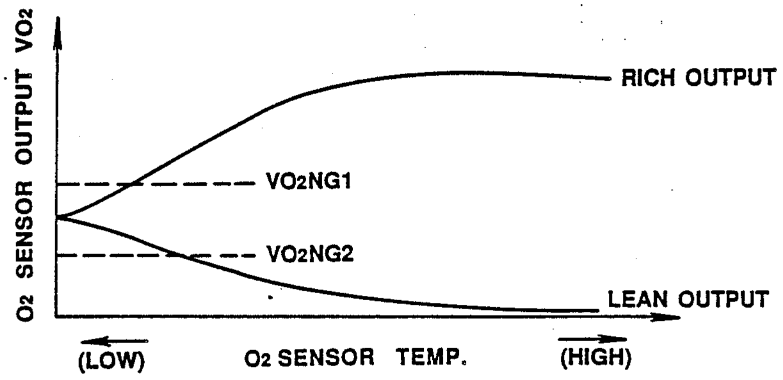
FIG. 6 is a chart which shows in terms of sensor output voltage and sensor temperature, the upper and lower voltage limits which are used in screening the operation of the sensor for malfunction.

At step 1005 the mode of air-fuel control is checked to determine if closed loop feedback control has been implemented or the system is operating under open loop conditions. In the event that the system is under open loop control the program returns via step 1012 as the instant mode of operation does not require data input from the oxygen sensor. On the other hand, if close loop feedback control has been implemented, the routine proceeds to step 1006 wherein the injection pulse width Tp and the engine speed are used to determine if the engine is operating in the hatched testing zone shown in FIG. 5. Viz., it is determined if Tp is within a range of Tp1 to Tp2 and N is within the range of N1 to N2.

When the above requirements are satisfied, the program flows to step 1007 wherein it is determined if the output VO2 of the circuit 140 is within a range of VO2NG1 and VO2NG2. In the case of a positive result the routine goes to step 1008 wherein a second timer 2 is induced to start counting.

At step 1009 the instant value of timer 2 is checked in order to determine if a predetermined value T2 has been reached. In the event that T2 is reached and the output Ox of the oxygen sensor 118 is still within the VO2NG1–VO2NG2 window the program flows to step 1010 wherein a command to engergize the warning device 128 and indicate the the sensor is malfunctioning is issued.

As will be readily appreciated, if the engine control system is such as to render the air-fuel control system open loop, before timer 2 can complete its count, or the engine speed and load change in a manner wherein the values of either Tp or N are outside the above mentioned ranges, timer 2 is reset at step 1012 and thus guards against possible erroneous malfunction detection.

In brief, the above routine is such as to monitor the output of the oxygen sensor and the engine operation and to determine if the voltage generated by the sensor remains within a predetermined window for a predetermined time while the engine temperature is above a predetermined level and the engine is operating within a given set of conditions which define a suitable testing zone.

This diagnostic technique is such as to prevent erroneous malfunction detection as would be apt to occur in the even that a single reference level was used and malfunction was indicated by the sensor output falling below the level for a predetermined period. Viz., with such an arrangement in the event that, due to the various unit to unit deviations in air-flow sensors and/or fuel injectors which might bring about a prolonged leaning or enriching of the air fuel mixture being combusted and induce an erroneous diagnosis. On the other hand, with the invention under the same circumstances the output voltage of the sensor will drop below VO2NG2 or rise above VO2NG1 and the program will flow from step 1007 to step 1012 and thus will result in a clearing of the timer 2 thus obviate the change of an incorrect diagnosis of the instant sensor status.

What is claimed is:

1. A method of monitoring the operation of a oxygen sensor and diagnosing a malfunction thereof, comprising the steps of:
   - sensing the oxygen content of exhaust gases emitted from an internal combustion engine using an oxygen sensor, said oxygen sensor being operatively disposed in an exhaust conduit and arranged to be exposed to the exhaust gases emitted from said engine;
   - sensing said engine having assumed a warmed-up status;
   - sensing the engine load and the engine speed and determining the instant engine operational status using said engine load and engine speed after the engine has warmed-up;
   - determining if the instant engine operational status falls within a predetermined operational zone; and
   - indicating a oxygen sensor malfunction in the event that the oxygen sensor output remains continuously below a first predetermined value and above a second predetermined value for a predetermined period of time with said engine operating in said predetermined operational zone.

2. An oxygen malfunction detection arrangement comprising:
   - an oxygen sensor, said oxygen sensor being operatively disposed in an exhaust conduit and arranged to be exposed to the exhaust gases emitted from an engine;
   - an engine temperature sensor, said engine temperature sensor being arranged to issue a signal indicative of the engine coolant temperature;
   - an engine crank angle sensor; means for producing a signal indicative of engine load;
   - a control circuit, said control circuit including means for:
   - sensing the engine load and the engine speed, based on the outputs of said engine crankangle sensor and said engine load indicating signal means and for determining the instant vehicle driving status;
   - determining if the instant engine operational status falls within a predetermined operational zone; and
   - indicating a oxygen sensor malfunction in the event that the oxygen sensor output remains continuously below a first predetermined value and above a second predetermined value for a predetermined period of time after the engine temperature sensor indicates that the engine has warmed-up and the engine is detected as operating in said predetermined operational zone.

3. A method of monitoring the operation of an oxygen sensor mounted in the exhaust system of an internal combustion engine and diagnosing a malfunction of the oxygen sensor, comprising the steps of:
   - sensing engine temperature to determine if it exceeds a predetermined temperature level;
   - sensing an engine speed;
   - sensing an engine load;
   - determining from said engine speed and said engine load if engine operation is in a predetermined engine speed/load zone;
   - comparing an oxygen sensor output with first and second predetermined values while engine operation is in said predetermined engine speed/load zone and engine temperature is above said predetermined temperature level;
   - determining a timing period when said oxygen sensor output remains continuously within said first and second predetermined values;
   - indicating that said oxygen sensor is malfunctioning when said timing period exceeds a predetermined value.

4. A method as claimed in claim 3, wherein said first and second predetermined values are less than and greater than said oxygen sensor output when operating properly and exposed to rich and lean air fuel mixtures respectively.

5. An internal combustion engine having an oxygen sensor for sensing the amount of oxygen contained in the exhaust gases of the engine, the arrangement comprising:
   - means for sensing when engine temperature exceeds a predetermined temperature level;
   - means for sensing an engine speed;
   - means for sensing an engine load;
   - means for determining from said engine speed and said engine load if engine operation is in a predetermined engine speed/load zone;
   - means for comparing an oxygen sensor output with first and second predetermined values while engine operation is in said predetermined engine speed/-load zone and engine temperature is above said predetermined temperature level;
   - timing a period said oxygen sensor output remains continuously within the said first and second predetermined values; and
   - indicating that said oxygen sensor is malfunctioning when said oxygen sensor output remains continuously within said first and second predetermined values for a predetermined period.

6. An arrangement as claimed in claim 5, wherein said first and second predetermined values are less than and greater than said oxygen sensor output when operating properly and exposed to rich an lean air fuel mixtures respectively.

* * * * *